United States Patent [19]

Wolfe

[11] 4,109,697
[45] Aug. 29, 1978

[54] METHOD AND PATCH USED IN THE REPAIR OF A PNEUMATIC TIRE

[75] Inventor: Merritt W. Wolfe, Akron, Ohio

[73] Assignee: The Goodyear Tire & Rubber Company, Akron, Ohio

[21] Appl. No.: 782,251

[22] Filed: Mar. 28, 1977

[51] Int. Cl.² ............................................. B60C 21/00
[52] U.S. Cl. ...................................... 152/367; 138/99; 156/97
[58] Field of Search ........................ 152/367, 370, 371; 81/15.7; 156/97; 138/98, 99

[56] References Cited

U.S. PATENT DOCUMENTS

| | | | |
|---|---|---|---|
| 1,608,234 | 11/1926 | Reeve | 152/367 |
| 2,486,669 | 11/1949 | Nassimbene | 152/367 |
| 2,638,955 | 5/1953 | Gruber | 156/97 |
| 2,943,969 | 7/1960 | Boyer et al. | 152/367 |
| 3,009,846 | 11/1961 | Gruber | 152/367 |
| 3,468,359 | 9/1969 | Rutledge | 152/367 |

Primary Examiner—Albert J. Makay
Assistant Examiner—Carl Rowold
Attorney, Agent, or Firm—Frank Pincelli

[57] ABSTRACT

A method of repairing a small puncture, such as a nail hole in a pneumatic tire, and a patch used in such method. A conventional, plugless-type, circular rubber patch is provided for covering the puncture adjacent the inner peripheral surface of the tire. Unvulcanized rubbery material is disposed in a recess provided adjacent the puncture. The patch is then heated and placed under pressure to collapse the recess and force the unvulcanized rubbery material into the puncture and vulcanize it therein. In one aspect of the invention, a conventional rubber O-ring is utilized to form the recess and restrict movement of the unvulcanized rubbery material into the puncture.

11 Claims, 4 Drawing Figures

METHOD AND PATCH USED IN THE REPAIR OF A PNEUMATIC TIRE

BACKGROUND OF THE INVENTION

The invention is designed for repairing small punctures such as nail holes in a pneumatic tire, although the technology employed has been successfully used in repairing larger punctures, e.g. holes having a diameter of one-quarter of an inch.

Briefly stated, the invention envisions using a plugless, rubber patch for covering the puncture adjacent the inner peripheral surface of the tire. A recess is provided adjacent the puncture to hold unvulcanized rubbery material, and means are provided for restricting movement of the unvulcanized rubbery material into the puncture when the patch is heated and placed under pressure to collapse the recess and force the unvulcanized rubbery material from the recess, into the puncture.

DESCRIPTION OF THE DRAWING

The following description of the invention will be better understood by having reference to the annexed drawing, wherein.

DETAILED DESCRIPTION OF THE DRAWING

Figure 1:
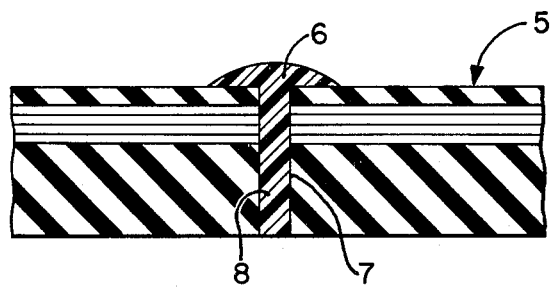
FIG. 1 is a section of a portion of a tire, illustrating a conventional repair and plug-type patch used in making the repair.

With reference to FIG. 1, there is shown a portion of a pneumatic tire 5, wherein a conventional plug-type patch 6 is utilized to repair and seal a small puncture 7 in the tire 5. A conventional electric drill is used to enlarge such small punctures for receipt of the tapering or cylindrical plug 8 of the plug-type patch 6. Sometimes, however, the nail holes or punctures 7 are so small that conventional, cylindrical, plugless-type patches are used to make the repair. In such cases, the small nail holes or punctures 7 should be filled with unvulcanized rubbery material to adequately make the repair and seal the puncture 7. The invention is designed to provide a simple, inexpensive and convenient patching device, wherein small punctures such as nail holes will always be properly filled with vulcanized rubbery material upon completion of the repair.

Figure 2:
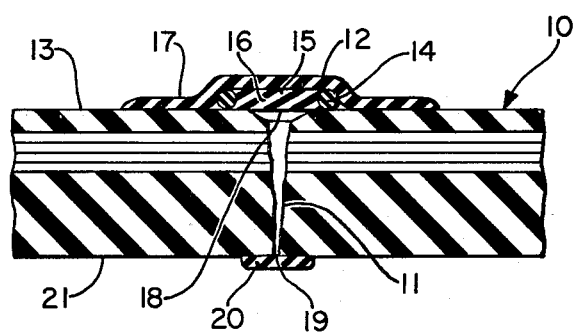
FIG. 2 is a section of a portion of a tire, illustrating a repair and a patching device made in accordance with the invention.

With reference to FIG. 2, there is shown a portion of a pneumatic tire 10 having a small puncture 11, such as a nail hole having a diameter of about 1/16 – ⅛ inches. A conventional, plugless patch 12 is provided to cover the puncture 11 adjacent the inner peripheral surface 13 of the tire 10. A conventional O-shaped ring 14, composed of vulcanized rubbery material, is interposed between the patch 12 and puncture 11. The O-ring 14 surrounds the puncture 11 and defines a recess or space 15 which is in communication with the puncture 11. The recess 15 is filled with an adequate supply of unvulcanized rubbery material 16 to make the repair.

Figure 3:
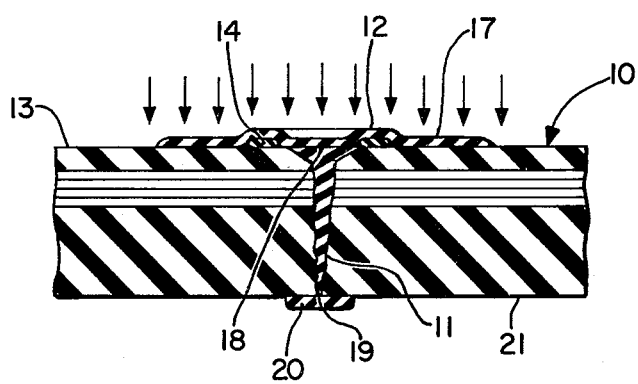
FIG. 3 is the same section of FIG. 2, showing the completed repair.

The patch 12 is then contacted with any suitable vulcanizing medium, under pressure. For example, a combination of steam and air at a temperature in excess of 200° F., or steam alone, at a temperature greater than 250° F., is directed against the outer exposed surface 17 of the patch 12 which, as best seen in FIG. 3, is compressed against the tire 10 and collapses the recess 15 to drive the unvulcanized rubbery material 16 into the puncture 11. The rubber O-ring 14 is partially collapsed by the pressure of the fluid, i.e. the circular cross-section of the O-ring 14 is reduced to a flattened oval, as best seen by a comparison of FIGS. 2 and 3. The O-ring 14 is properly sized to form a recess 15 which is adequate to hold a supply of unvulcanized rubbery material 16 sufficient to fill the puncture 11. The O-ring 14 also acts to restrict movement of the unvulcanized rubbery material, under pressure, from being dispersed into the areas adjacent the puncture 11, between the patch 12 and inner peripheral surface 13 of the tire 10, and directing the rubbery material into the puncture 11. It has been found convenient to attach the O-ring to the tacky inner surface of the patch 12 and then fill the recess 15, defined thereby, with an adequate supply of unvulcanized rubbery material 16, although the unvulcanized material 16 can be placed directly over the puncture 11 followed by the rubber O-ring which is pressed into the soft, unvulcanized material 16. Any suitable rubber cement or adhesive is utilized between the contacting surfaces of the patch 12 and tire 10 to permanently bond the patch 12 to the tire 10.

It is important to provide a pressure differential between the two opposing ends 18,19 of the puncture 11 to insure movement of the unvulcanized rubbery material 16 from the recess 15 into the puncture 11. This is accomplished, for example, by sealing the outer, exteriorly exposed end 19 of the puncture 11 by any suitable means, e.g. seal 20 which can be permanently or temporarily adhered to the outer peripheral surface 21 of the tire 10 by any suitable rubber adhesive or cement.

Figure 4:
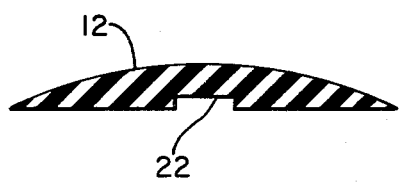
FIG. 4 is a section of another embodiment of the patching device.

Another embodiment of a plugless patching device 12 is shown in FIG. 4. In this instance, the plugless patch 12 is provided with a centrally disposed circular recess 22 for receiving unvulcanized rubbery material 16 used in filling the puncture 11.

Thus, there has been provided a novel patching device and method for using such device in the repair of a small puncture in a pneumatic tire.

What is claimed is:

1. A method of patching a puncture such as a nail hole, in a pneumatic tire, comprising:
    (a) covering the puncture with a patch adjacent the inner peripheral surface of the tire;
    (b) interposing unvulcanized rubbery material between the patch and puncture;
    (c) directing fluid pressure and heat against the patch to compress the patch against the tire and unvulcanized rubbery material to force the material into the puncture, and vulcanize the material driven into the puncture, and bond the patch to the inner peripheral surface of the tire; and
    (d) restricting the outward movement of the unvulcanized rubbery material beyond the patch so as to force said rubbery material into the puncture when pressure is exerted on the patch and rubbery material.

2. The method of claim 1, which includes sealing the end of the puncture opposite the end thereof covered by the patch.

3. The method of claim 2, wherein the patch includes a recess adjacent the puncture, the recess being of adequate size to hold unvulcanized rubbery material sufficient to fill the puncture.

4. The method of claim 2, which includes a resilient O-shaped ring surrounding the puncture between the patch and inner peripheral surface of the tire, the O-ring designed to form the recess for holding the unvulcanized rubbery material and restrict movement thereof, under pressure, into the puncture.

5. A device used in the repair of a puncture, such as a nail hole in a pneumatic tire, comprising in combination:
 (a) a plugless-type patch for covering the puncture adjacent the inner peripheral surface of the tire; and
 (b) means associated with the patch for forming a recess over the puncture adjacent the inner peripheral surface of the tire, the recess being adequate to hold unvulcanized rubbery material sufficient to fill the puncture, said means also restricting the outward movement of the unvulcanized rubbery material beyond the patch so as to force said rubbery material from said recess into the puncture when pressure is exerted against the patch and the material.

6. The device of claim 5, wherein said means includes a patch having a centrally disposed recess formed in the surface of the patch contacting the inner peripheral surface of the tire.

7. The device of claim 5, wherein said means includes a resilient, O-shaped ring which is separate from the patch.

8. The device of claim 7, wherein the O-ring is composed of vulcanized rubbery material.

9. The device of claim 8, which includes unvulcanized rubbery material for filling the recess.

10. The device of claim 9, which includes means for bonding the patch to the inner peripheral surface of the tire being repaired.

11. The device of claim 10, which includes means cooperating with the patch to seal the end of the puncture opposite the end thereof covered by the patch.

* * * * *